(12) United States Patent
Kuckelkorn et al.

(10) Patent No.: US 7,637,259 B2
(45) Date of Patent: *Dec. 29, 2009

(54) SOLAR COLLECTOR

(75) Inventors: Thomas Kuckelkorn, Weiden i.d. Opf. (DE); Christina Hildebrandt, Freiburg (DE); Martin Eickhoff, Calle Baja (ES)

(73) Assignee: Schott AG, Mainz (DE)

( * ) Notice: Subject to any disclaimer, the term of this patent is extended or adjusted under 35 U.S.C. 154(b) by 359 days.

This patent is subject to a terminal disclaimer.

(21) Appl. No.: 10/578,035

(22) PCT Filed: Nov. 4, 2004

(86) PCT No.: PCT/EP2004/012493

§ 371 (c)(1),
(2), (4) Date: May 2, 2006

(87) PCT Pub. No.: WO2005/045329

PCT Pub. Date: May 19, 2005

(65) Prior Publication Data

US 2007/0095340 A1      May 3, 2007

(30) Foreign Application Priority Data

Nov. 4, 2003   (DE) .................................. 103 51 474

(51) Int. Cl.
*F24J 2/06* (2006.01)
*F24J 2/12* (2006.01)
(52) U.S. Cl. ........................ 126/635; 126/652; 126/694; 126/688

(58) Field of Classification Search ................. 126/635, 126/694, 652; 285/911, 45
See application file for complete search history.

(56) References Cited

U.S. PATENT DOCUMENTS

| 4,202,322 | A  | * | 5/1980  | Delgado et al. | ............. 126/574 |
| 4,295,462 | A  | * | 10/1981 | Bunch | ........................ 126/605 |
| 4,703,749 | A  |   | 11/1987 | Morse et al. | |
| 7,013,887 | B2 | * | 3/2006  | Kuckelkorn et al. | ........ 126/652 |
| 7,240,675 | B2 | * | 7/2007  | Eickhoff | ..................... 126/652 |

FOREIGN PATENT DOCUMENTS

JP  56-155333  12/1981
WO  03/042609  5/2003

* cited by examiner

*Primary Examiner*—Kenneth B Rinehart
*Assistant Examiner*—Daniel A Bernstein
(74) *Attorney, Agent, or Firm*—Michael J. Striker

(57) ABSTRACT

The invention relates to a solar collector comprising an absorber tube (13) supported by supports. Radiation-permeable cladding tubes (15) are located between the supports and surround the absorber tube (13). Compensation pieces (17) are provided between the cladding tubes (15) due to the fact that the absorber tube (13) and the cladding tubes (15) have different expansion behaviors. In order to also capture radiation that strikes the connection area (50), at least one mirror collar (20) is provided that reflects the solar radiation into the area of the active absorber tube surface. This mirror collar (20) is capable of reflecting the concentrated solar radiation coming from different directions from the parabolic mirrors even at different solar angles of incidence upon the active absorber surface.

13 Claims, 10 Drawing Sheets

SOLAR COLLECTOR

The present invention relates to a solar collector with an absorber tube, a concentrator which focusses solar radiation onto the absorber tube, and at least one radiation-permeable cladding tube that encloses the absorber tube, compensation pieces for length compensation being provided in connection areas between the cladding tubes.

Concentrators are understood to be devices that focus solar radiation onto the absorber tube. They can be optical devices, for example. Parabolic mirrors with a trough configuration are preferred. The radiation reflected on parabolic troughs of this nature is concentrated in a focal line in which the absorber tube and the cladding tube are located. Parabolic troughs of this type can also be composed of a plurality of trough segments with separate radii of curvature and focal lines.

Commercial solar high-temperature parabolic trough collectors have high optical losses at the connection areas of the glass cladding tubes. The cladding tubes are interrupted in the connection areas in which the supports attach to the absorber tubes, rendering these longitudinal areas unavailable for energy absorption. Parabolic trough collectors which track the sun via a single axis concentrate the incoming solar energy on a focal line. Absorber tubing through which a heat-transfer medium—typically thermal oil or water—flows extends in this focal line. A majority of the concentrated solar radiation is converted to thermal energy by the absorber tubing and is given off to the heat-transfer medium. To avoid thermal convection losses in the high-temperature range, the hot, selectively coated absorber tube is enclosed in a glass cladding tube, and the intermediate space between the cladding tube and the absorber tube is filled with a vacuum. To ensure stability and durability, the absorber tubing is composed of a large number of tube pieces positioned one behind the other and welded together. Metallic supports are attached to the connection areas to hold the absorber tube in the focal line of the parabolic trough collector. In the irradiated state, the hot absorber tube expands more than the cladding tube, which is cooler. In commercial absorber tubes, compensation pieces are therefore provided between the cladding tubes. These compensation pieces are typically composed of metallic bellows that bridge the distance between the cladding tubes and compensate for different longitudinal expansions. The compensation pieces are shaded from the concentrated solar radiation by radiation-protection elements, e.g., aluminum sheets, to primarily protect the glass-metal welded connections from extreme temperature gradients.

Commercial solar high-temperature parabolic trough collectors have high optical losses at the absorber tube connection areas. Since flexible glass-metal transitions and space for the supports are required, the connection areas cannot be designed as an active absorber tube surface, and the incoming, concentrated solar radiation cannot be absorbed by the system. Approximately 5 to 6% of the radiation reflected by the parabolic mirrors is lost as a result of this inactive area. Due to the fact that the angle of incidence changes constantly, making use of the radiation arriving in the inactive area appears to be a very complicated endeavor.

The object of the present invention is to create a solar collector that better utilizes the incoming solar energy.

The solar collector according to the present invention has the features of claim 1. Accordingly, at least one mirror collar which surrounds the cladding tube is located in the connection areas.

The mirror collar is a secondary reflector that reflects the concentrated solar radiation from the connection area into the area of the active absorber tube surface. The mirror collar—which extends around part or all of the circumference—is capable of reflecting the concentrated solar radiation coming from different directions from the parabolic mirrors onto the active absorber tube surface, even when different solar angles of incidence are involved. Although a portion of the length of the absorber tube can be covered by the mirror collars, the solar radiation that hits this part is directed via secondary reflectance into the absorbent longitudinal region of the absorber tube.

According to a first embodiment, a mirror collar which encloses the cladding tube and has a conical shape that extends around part or all of the circumference of the cladding tube is located in the connection areas.

The conical shape of the mirror collar means the diameter of the mirror collar decreases in the longitudinal direction of the absorber tube, and/or that the mirror collar tapers in a certain direction. This tapering can be conical in shape, but it can also deviate from a conical shape and be, e.g., slightly concave or convex.

Nor is it necessary for the mirror collar to extend around the entire circumference of the cladding tube or the absorber tube. It need only cover the area under consideration for incoming solar radiation and, from this area, divert the radiation to the adjacent cladding tube and/or through this cladding tube to the absorber tube.

The mirror collar can have two conical surfaces located next to each other and extending in the opposite directions. In this case, the incoming radiation is reflected to opposite sides of the absorber tube, or a portion of the radiation strikes the mirror collar and another portion passes by the mirror collar. The two conical surfaces can have different taper angles. In the northern hemisphere, the conical surface facing south preferably has the greater taper angle, while the conical surface facing north has the smaller taper angle. The taper angle indicates the steepness of the conical surface relative to the axis of the absorber tube.

It is preferably provided that the mirror collars cover part or all of the compensation pieces and/or the radiation-protection elements in the longitudinal direction of the cladding tube. The mirror collar is not only the reflector, but also a type of protective housing for the connection area and the compensation pieces contained therein.

According to another embodiment, it is provided that the mirror collar includes at least one planar surface.

Compared to a conical surface, planar surfaces have the further advantage that the radiation is not reflected divergently, but rather that the reflectance corresponds to an optical axial signature. The focus remains within the focal line, thereby enabling a further increase in output.

The planar surface is preferably oriented perpendicularly to the axis of the cladding tube.

The planar surface is preferably an annular surface. The annular surface can extend around the entire circumference of the cladding tube or, as a partial annular surface, it can extend around only one section.

A preferred embodiment provides for a plurality of planar surfaces located on a cone. This results in planar facet surfaces, the enclosing end of which is a cone. This design is advantageous in particular when the concentrator is a parabolic trough composed of a plurality of parabolic segments, each of which has a separate radius of curvature. Preferably, at least one planar surface is assigned to one parabolic segment. This means the planar surface is located on the conical surface such that the focal line associated with the parabolic segment strikes the relevant planar surface.

Preferably, two planar surfaces are assigned to one parabolic segment. One surface of the surface pair is located on the half of the cone facing away from the parabolic trough, and the second surface is located on the half of the cone facing the parabolic trough.

Since two to four parabolic segments are preferably provided, the mirror collar also preferably includes four to eight planar surfaces.

The ratio h divided by L is preferably between 0.3 to 1, with h being the height of the mirror collar perpendicular to the axis of the cladding tube, and L being the length of the connection area. The ratio is preferably selected such that, at any time of year, the length of the shaded area V is shorter than length L of the connection area. This depends on the location where the solar collector is installed and, therefore, on the angle of incoming solar radiation.

The mirror collar is preferably composed of aluminium.

The present invention is explained below in greater detail using exemplary embodiments, with reference to the attached drawing. The description of special exemplary embodiments is not limited to the scope of protection of the present invention.

Figure 4:
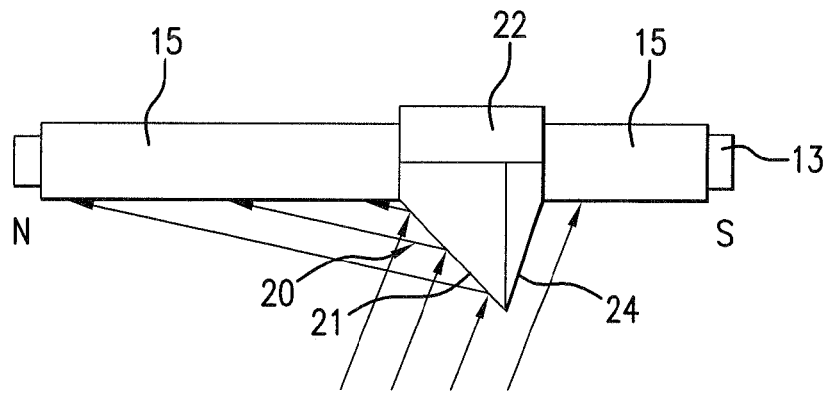
FIG. 4 shows an embodiment with singularly hemispherical, dual mirror collars.
Figure 5:
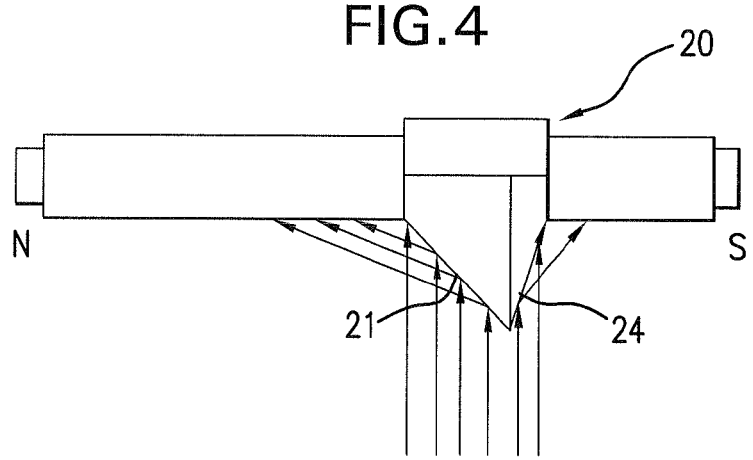
Figure 6:
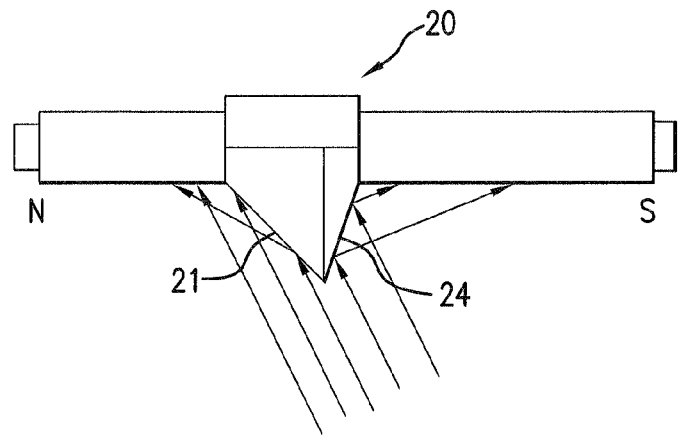
Figure 7:
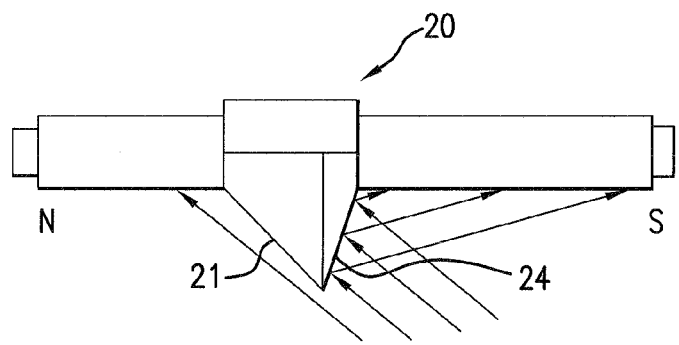
Figure 8:
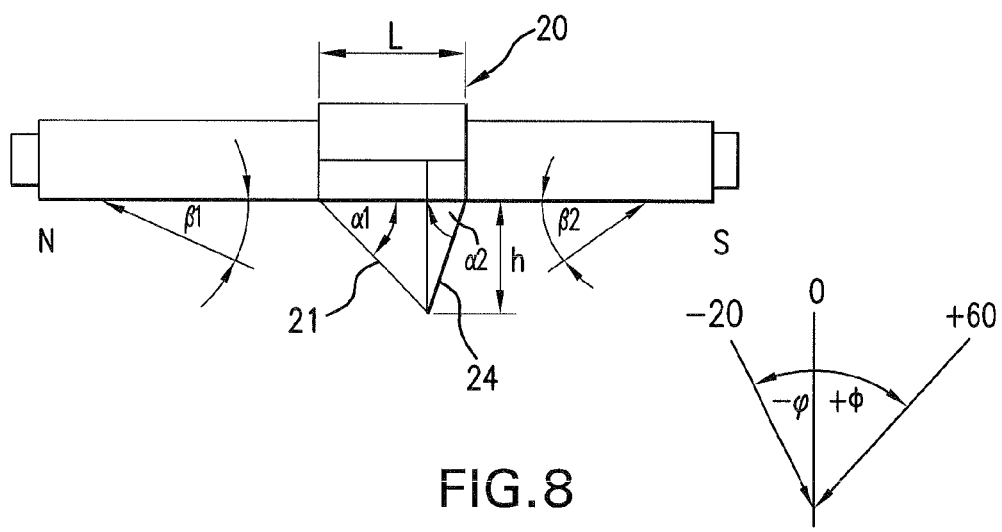
Figure 9:
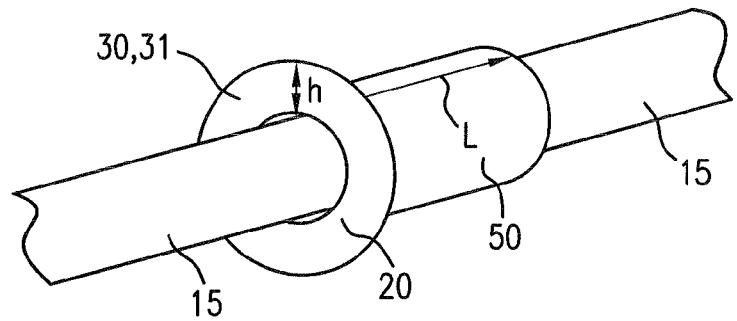
Figure 10A:
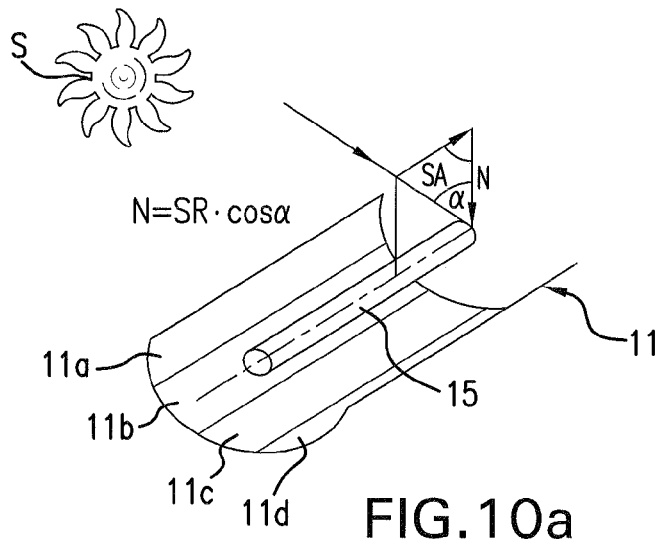
Figure 10B:
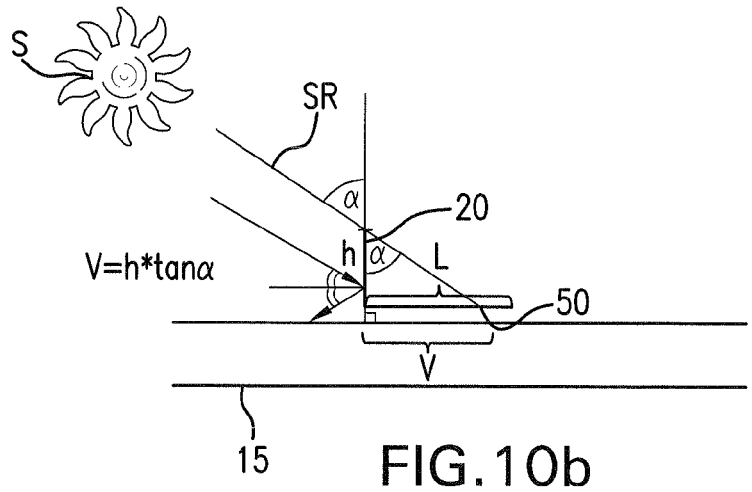
Figure 11:
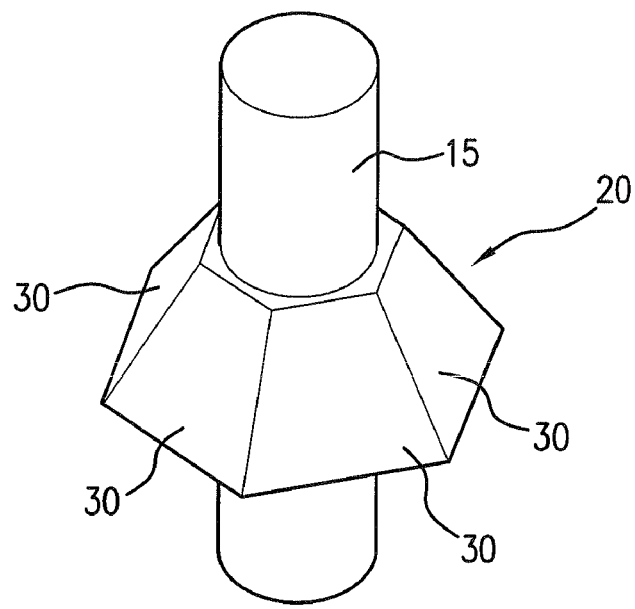
Figure 12:
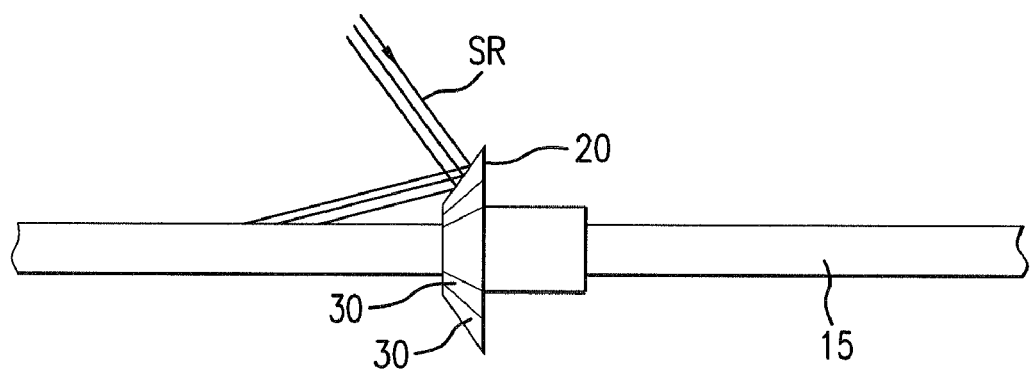
Figure 13:
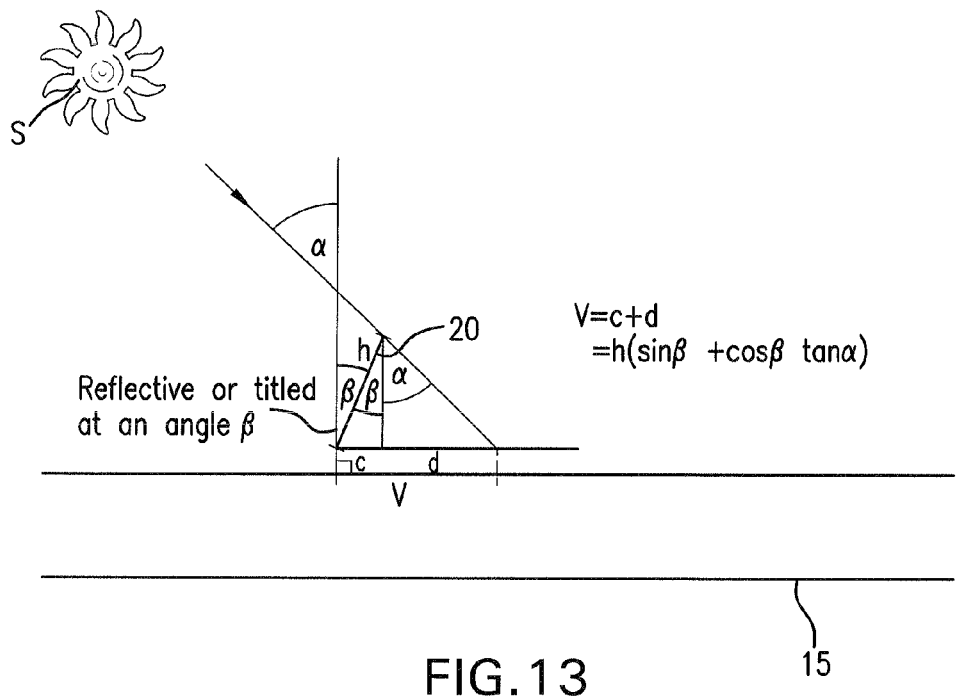

FIGS. 5, 6 and 7 show different situations of the radiation incidence on mirror collar in FIG. 4, FIG. 8 shows a drawing with the various lengths and angles labelled, FIG. 9 shows a perspective drawing of an absorber tube system with cladding tube and mirror collar with a flat surface, FIG. 10a shows a perspective illustration of a parabolic trough collector with a plurality of parabolic segments, FIG. 10b shows a schematic side view of the system shown in FIGS. 10 and 10a, FIG. 11 shows a mirror collar with a plurality of planar surfaces, FIG. 12 shows the side view of the system shown in FIG. 11, and FIG. 13 shows a schematic illustration of the system shown in FIGS. 11 and 12, and FIGS. 14 through 22 are diagrams that illustrate the solar yield.

Figure 1:
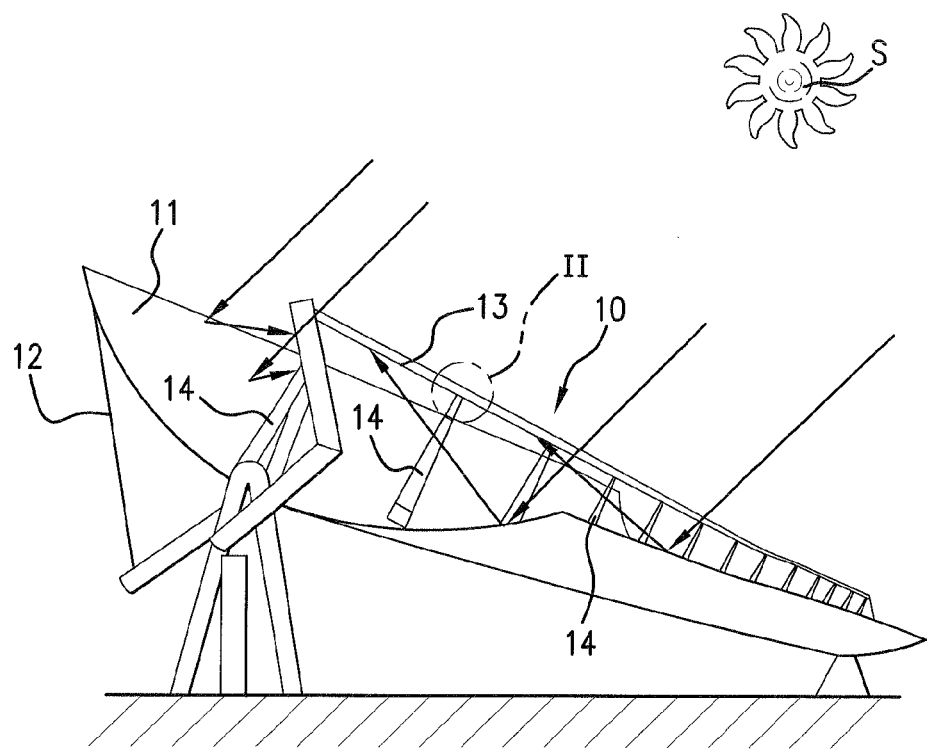
FIG. 1 shows a perspective illustration of a parabolic trough collector.

A parabolic trough collector 10 is shown in FIG. 1 that has a longitudinally-extending, parabolic reflector 11 with a parabolic profile. Parabolic reflector 11 is provided with a support structure 12 composed of a framework. An absorber tube 13 extends along the focal line of parabolic reflector 11 that is fastened to supports 14 which, in turn, are connected with the parabolic reflector. Together with supports 14 and absorber tube 13, the parabolic reflector forms a single unit which is swiveled around the axis of the absorber tube to track the position of sun S via a single axis. The parallel solar radiation coming from sun S is focussed by parabolic reflector 11 onto absorber tube 13. A heat-transfer medium, e.g., water or oil, flows through the absorber tube and is heated by the absorbed solar radiation. The heat-transfer medium can be removed at the outlet end of the absorber tube and supplied to a heat exchanger or another energy-consuming device.

Figure 2:
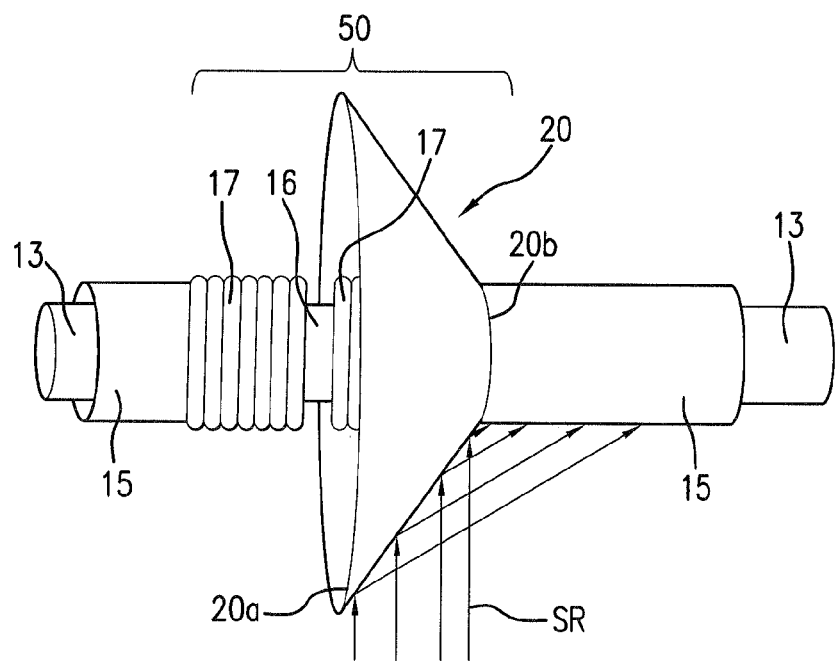
FIG. 2 shows a depiction of detail II in FIG. 1 to illustrate the design of the connection area with a circumferential mirror collar.

FIG. 2 shows absorber tube 13, which is composed of a plurality of tube sections and is surrounded by glass cladding tubes 15. Cladding tubes 15 serve to reduce thermal convection losses and thermal radiation losses in the high-temperature range. The intermediate space between absorber tube 13 and cladding tube 15 contains a vacuum. To ensure stability and durability, the absorber tubing is composed of a large number of interconnected absorber tubes. Supports 14 are attached at connection points 16. Connection points 16 are therefore not covered by cladding tube 15. In the irradiated state, hot absorber tube 13 expands more than cladding tube 15, which is cooler. For this reason, compensation pieces 17 in the form of a metallic bellows are welded onto the ends of the absorber tubes. Compensation pieces 17 ensure a flexible metal-glass transition, in order to compensate for the various longitudinal expansions.

According to the present invention, a mirror collar 20 which encloses absorber tube and/or cladding tube 15 is located in the connection area between two adjacent cladding tubes 15, mirror collar 20 having the shape of a truncated cone extending circumferentially 360° in this exemplary embodiment. Mirror collar 20 has a metal coating on the exterior. It has a wide conical end 20a with a large diameter and, diametrically opposed thereto, a narrow conical end 20b with a smaller diameter. The diameter of conical end 20b is equal to the outer diameter of cladding tube 15. Mirror collar 20 abuts the end of cladding tube 15, and it covers the connection area 50 to adjacent cladding tube 15 over at least part of the tube length. With the present exemplary embodiment, a compensation piece 17 is provided in the hollow space enclosed by the mirror collar. A second (not shown) mirror collar can be located on the other side of connection point 16 and cover the other bellows 17. The two mirror collars are then facing each other with their large ends 20a. A support 14 is located between them.

Mirror collars 20 have the effect that incident solar radiation SR is reflected on the conical mirror surface and cast onto adjacent absorber tube 13. As shown, solar radiation SR striking between the tubes is diverted by mirror collar 20 on the exposed area of absorber tube 13 and passes through cladding tube 15 to the absorber tube. The energy yield of parabolic trough collector 10 is improved as a result.

Figure 3:
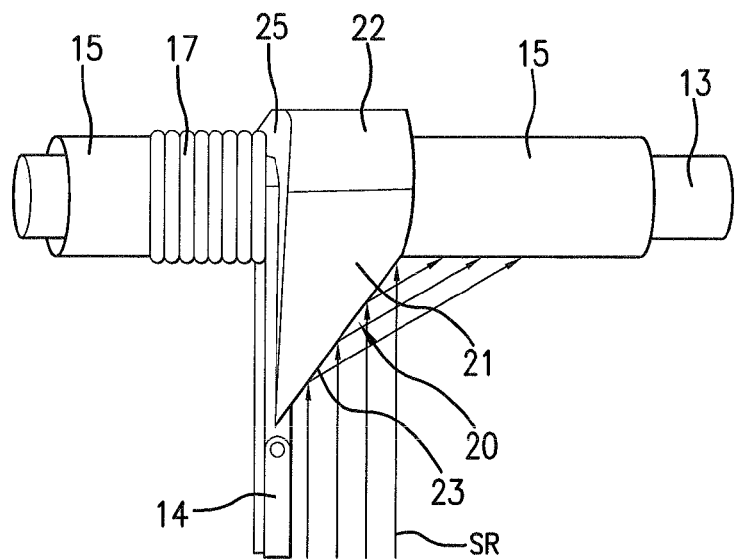
FIG. 3 shows an embodiment with a hemispherical mirror collar.

FIG. 3 shows an exemplary embodiment with which mirror collar 20 extends around only half the circumference of cladding tube 15 and has a nearly hemispherical, conical region 21, the ends of which are connected by a nearly hemispherical, flat region 22, so that cladding tube 15 is enclosed circumferentially 360° by regions 21 and 22. Conical region 21 has a metal-coated reflection surface 23 that diverts solar radiation SR to the adjacent region of absorber tube 13. Support 14 that holds absorber tube 13 is shown in FIG. 3. Compensation pieces 17 are located on both sides of support 14, only one of which is shown in FIG. 3, the other one being covered by mirror collar 20. In the finished state, two mirror collars 20 are in place, each one covering one of the compensation pieces. Thermal insulation 25 is provided between the two mirror collars.

In practice, solar collectors are oriented primarily in the north-south direction and track the sun axially from the east to the west, to obtain the maximum annual yield. At different times of the day and year, the angles of incidence from the north or south are different, depending on the location. FIGS. 4 through 7 show the radiation behavior of a north-south oriented parabolic trough collector at different angles of incidence for a location in southern Europe.

Exemplary embodiment shown in FIGS. 4 through 7 is based on a mirror collar 20 that has a first conical surface 21 and a second conical surface 24, the large ends of which abut each other back-to-back. The two conical surfaces 21 and 24 are hemispheres that extend around half of the circumference.

Dual mirror collar 20 in FIG. 4 extends across the entire connection area, thereby covering both compensation pieces 17.

Due to the fact that all of the concentrated radiation coming from the parabolic mirrors from various directions ideally strikes the focal line even when different angles of incidence are involved, the insolation is star-shaped and, therefore, rotationally symmetrical even when there are different angles of incidence at the absorber tube, the axis of rotation of the insolation coinciding with the focal line in the absorber tube. Since the mirror collar is basically rotationally symmetrical in design, the radiation path drawn in FIGS. 4 through 7 is representative of all other radially incident beam paths, due to rotational symmetry.

FIG. 4 shows the radiation behavior of a two-sided mirror collar 20 in the morning and evening in the summer. Solar radiation SR enters at a steep angle from the north and primarily strikes large conical surface 21 facing north, from which it is reflected onto the absorber tube. In this state, conical surface 24 has no substantial reflectance effect.

FIG. 5 shows the radiation behavior of the mirror collar during a day in the summer. In the summer, the reflected radiation strikes perpendicularly or with a small angle of incidence for nearly the entire day. Both conical surfaces 21 and 24 have a reflecting effect.

FIG. 6 shows the radiation behavior of a two-sided mirror collar in the fall and spring. The radiation arrives at an angle from the southerly direction and strikes both conical surfaces 21 and 24, which reflect the radiation to the absorber tube.

FIG. 7 shows the radiation behavior of a two-sided mirror collar 20 in the winter. The radiation arrives from the south at small angle of incidence, i.e., substantially parallel to conical surface 21. The radiation strikes conical surface 24 at a large angle of incidence and is reflected by conical surface 24 onto absorber tube.

FIG. 8 shows the inclination angles of the northern and southern mirror collar, which are adjusted for the local angles of incidence as follows.

The symbols mean:
$\alpha1$=Inclination angle of the northern mirror collar
$\alpha2$=Inclination angle of the southern mirror collar
$\phi$=Angle of solar incidence
$\beta1$=Northern absorber angle of incidence of radiation reflected by the collar
$\beta2$=Southern absorber angle of incidence of radiation reflected by the collar
h=Collar height
L=Length of the absorber tube connection piece=Length of the connection area This results in the following relationships, as shown in FIG. 8:

$$\beta1 = 2*\alpha1 - 90° + \Phi \quad (1)$$
$$(-20° < \Phi < 90° - \alpha1)$$

$$\beta2 = 2*\alpha2 - 90° - \Phi \quad (2)$$
$$(\alpha2 - 90° < \Phi < +60°)$$

$$h = \frac{L}{\frac{1}{\tan(\alpha1)} + \frac{1}{\tan(\alpha2)}} \quad (3)$$

For southern Europe, the angles of incidence are mainly between $\phi$=20° and $\phi$=+60°. In this range, approximately 97% of the solar energy strikes the collector. If, in terms of extreme angles of incidence, an angle of approximately 10° is considered to be sufficient, then, based on the dependencies shown in FIG. 8, a northern inclination angle of $\alpha1$=60° and a southern angle of incidence of $\alpha2$=80° results for the mirror collar. In a parabolic trough power station, the majority of solar energy strikes within the range $\phi$=10° to $\phi$=20°. In this range, relatively large angles of incidence of 50° to 60° result for the inclination angles described. With large inclination angles, the distance between the mirror collar and the active absorber tube is less, and the hitting accuracy of the mirror collar is greater.

FIG. 9 shows, schematically, a perspective depiction of a system of absorber tubes and cladding tubes 15. The connection area 50, in which the compensation elements are located, is covered with an insulated radiation-protection element. This connection area and/or the insulated radiation-protection element 50 has length L. A mirror collar 20—which has a planar surface 30 in the form of a ring 31 positioned perpendicularly to the tube axis—is located on the left end of connection area 50, which corresponds to the southern end of connection area 50 when the system is installed in the northern hemisphere. The height of ring 31 is labelled "h".

An embodiment with a parabolic reflector 11 with four parabolic segments 11a-11d is shown in FIG. 10a. The focal lines associated with the parabolic segments are not shown in FIG. 10a, but they are in the region of the absorber tube and/or cladding tube 15. Solar radiation SR arrives at an angle $\alpha$, which is also indicated in FIG. 10b.

To illustrate the mathematical relationship V=h×tan($\alpha$), FIG. 10b shows a schematic depiction of a side view of the system shown in FIGS. 9 and 10a. $\alpha$ is the angle of incidence of solar radiation, L is the length of the connection area, and V is the length of the shaded area. With the system shown in FIG. 10b, V is shorter than length L, so that, with the angle of incidence a shown, cladding tube 15 to the right of connection area 50 is not in the shade.

A further embodiment of mirror collar 20 is shown in FIG. 11, mirror collar 20 having a total of six planar surfaces 30 while are tilted relative to the axis of cladding tube 15. Planar surfaces 30 are facet surfaces on a conical surface.

This system is depicted again in FIG. 12, in a side view, and incoming solar radiation SR is also indicated.

FIG. 13 shows yet another side view of this system to illustrate the mathematical relationships. Length of shaded area V is determined by V=c+d=h (sin$\beta$+cos$\beta$·tan$\alpha$), where $\beta$ is the inclination of mirror collar 20 and/or the inclination of planar surfaces 30 of mirror collar 20.

Optical efficiency is increased when a mirror collar of this type is provided with planar surfaces in connection area 50 between two adjacent tubes by that fact that radiation which would otherwise strike the connection area and be reflected back to the parabolic mirror is also diverted to the cladding tube and/or the absorber tube.

When the system is installed in the northern hemisphere, mirror collar 20 is installed on the southern side of the transition region. The mirror collar can be attached as an annular disk 31 at an angle $\beta$ of 90° to an angle $\beta$ of 45° as mirror collar 20 with planar surfaces 30.

At an angle $\beta$ of 90°, the yield is highest in the winter. With smaller angles, the yield increases in the summer, but the yield decreases in the winter. The level of yields and losses depends on the geographic location, the orientation of the solar collector, and the shadow cast by adjacent solar collectors, which is referred to horizon shade.

The following case example was calculated using Malaga as the location, with a north-south orientation of the solar collector, and a horizon shade angle of 15°.

Figure 14:
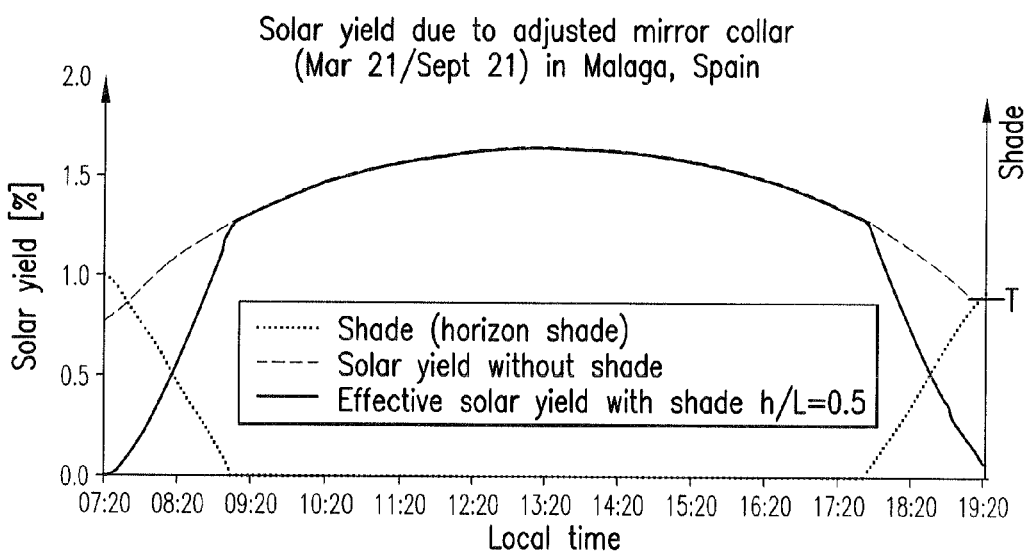

In FIG. 14, the shade (horizon shade) is depicted as a function of the local time for the 21st day of March/September. The value T on the right y-axis indicates the total amount of shade cast by the adjacent solar collector(s).

The curve obtained when horizon shade is not taken into account is referred to as "solar yield without shade". If the shade (horizon shade) is taken into account, the curve indicated by a solid line is obtained; it represents the effective solar yield. An h by L ratio of 0.5 was selected. The solar yield is based on the absorbed energy of a system without mirror collars.

Figure 15:
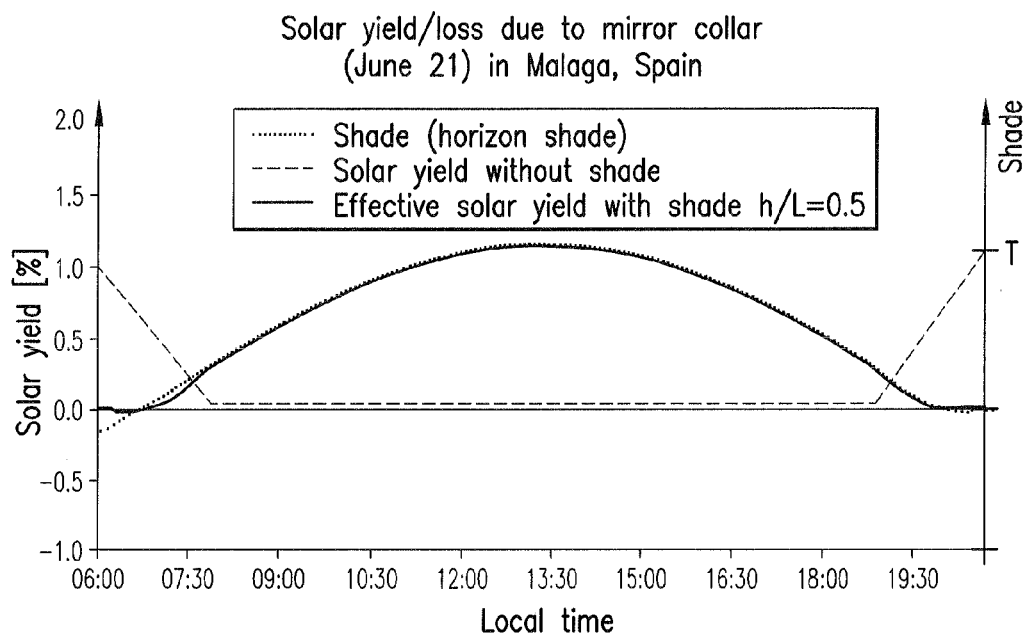
Figure 16:
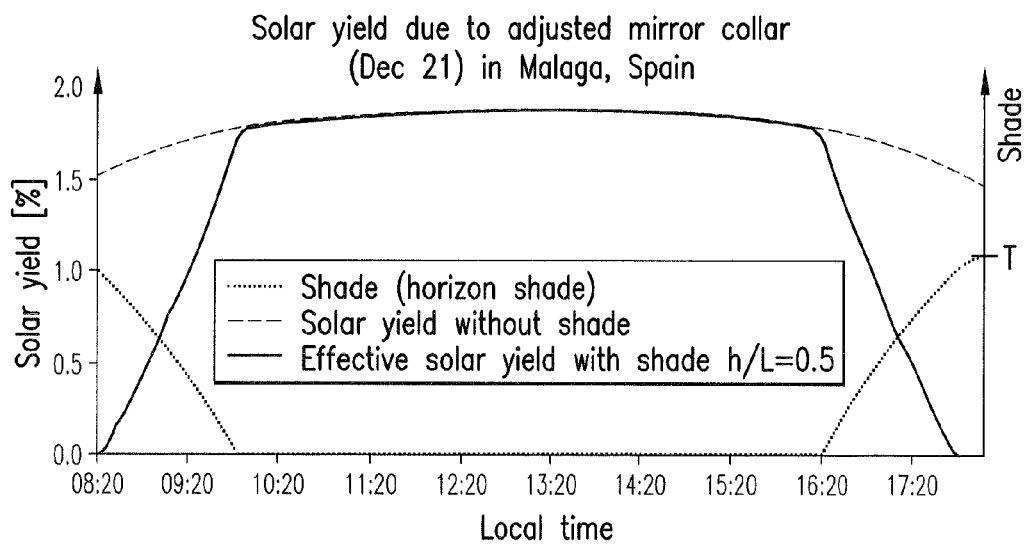

FIGS. 15 and 16 show the curves for June $21^{st}$ and December $21^{st}$.

Figure 17:
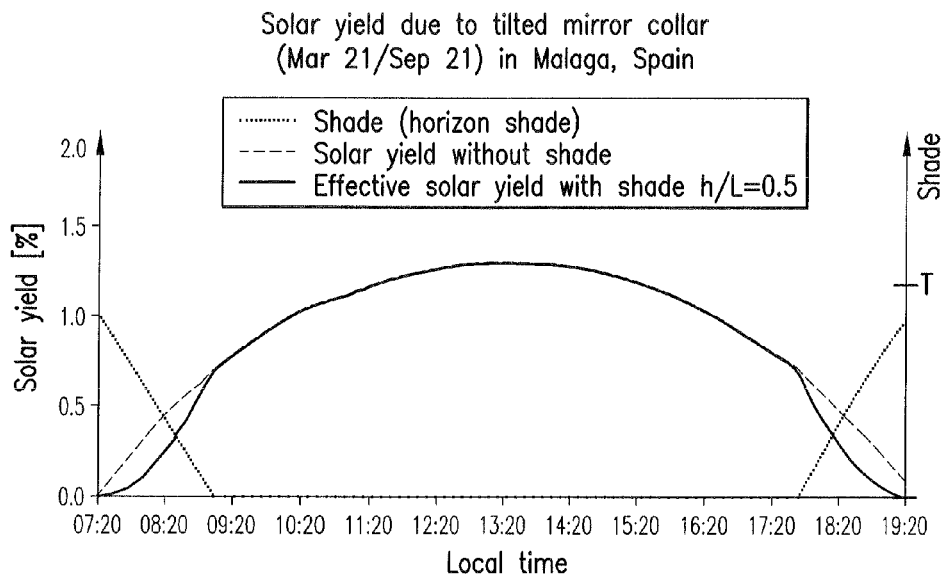
Figure 18:
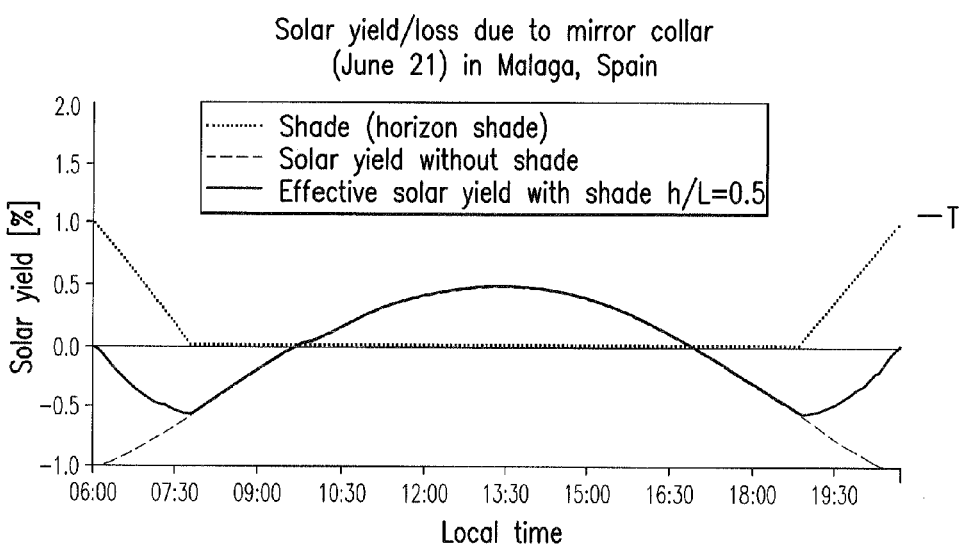
Figure 19:
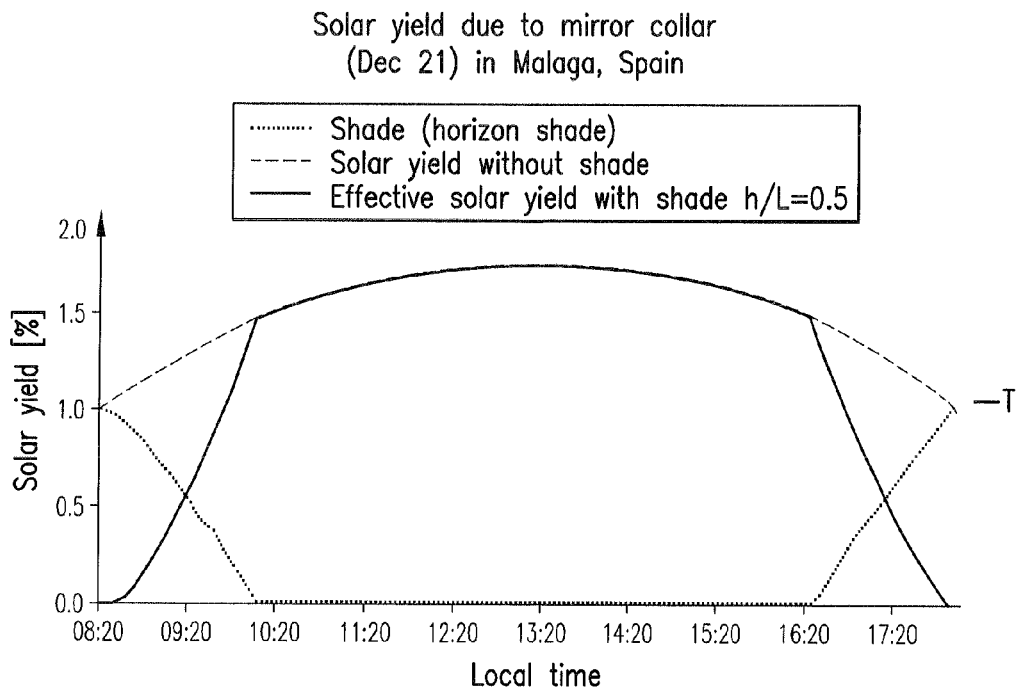

FIGS. 17 through 19 show diagrams for the h/L ratio of 0.55.

As a result of the h/L ratio of 0.55, the length of the shaded area V is shorter than length L of the connection area throughout the entire year, as indicated in FIG. 10b. As a result, solar yields and losses occur only on the southern side of the connection area. No losses occur on the northern side due to shading of the absorber tube. Losses occur in the summer and in the morning and evening hours. During this time, the solar collector is partially shaded by the horizon shade, and output-related losses are reduced as a result.

The yields and losses are nearly identical on June $21^{st}$. For all other days, the yields increase and the losses are reduced. In the six months of winter, there are only yields on the southern side. If the ratio r/L is greater than 0.55, the yields increase in the six months of summer. Simultaneously, losses occur in the six months of winter as a result of shading of the absorber tube on the northern side.

The mirror collar can also be installed at an angle $\beta<90°$ relative to the axis of the cladding tube. As a result, the yields increase in the six months of summer, and the losses are reduced in the morning and evening hours. An optical expansion of the focal line is prevented by individual planar surfaces 30.

Figure 20:
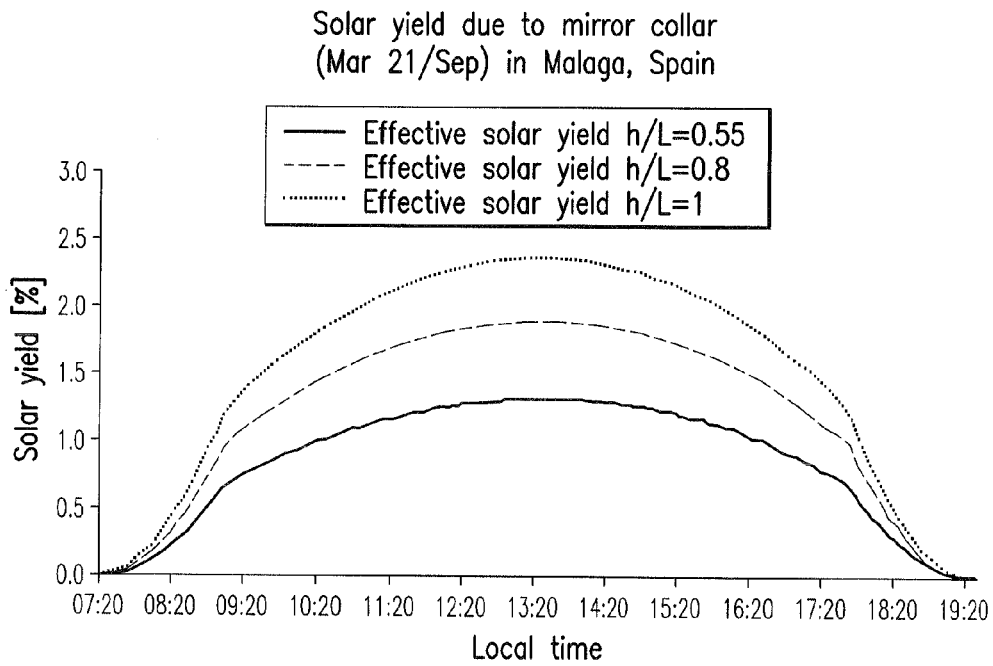
Figure 21:
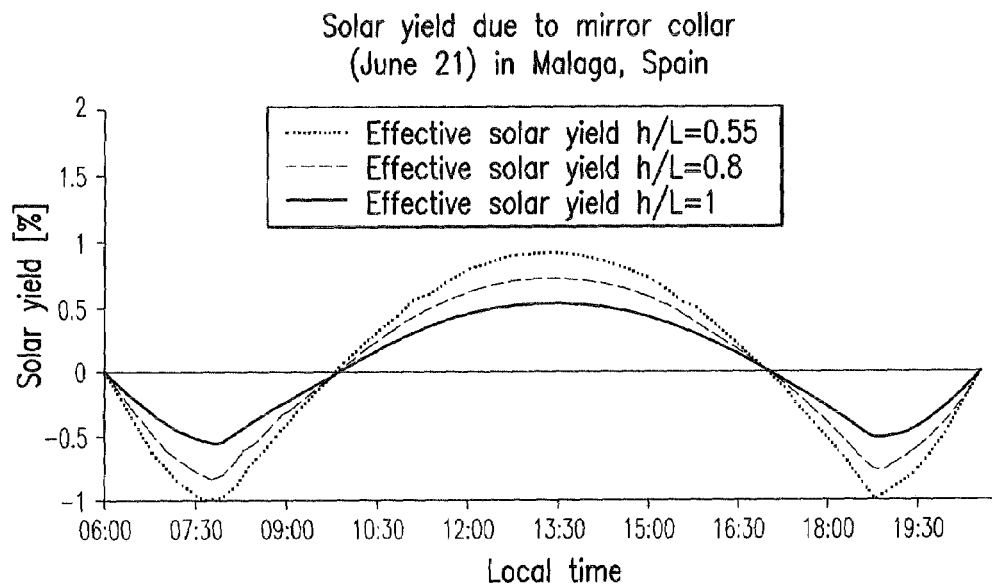
Figure 22:
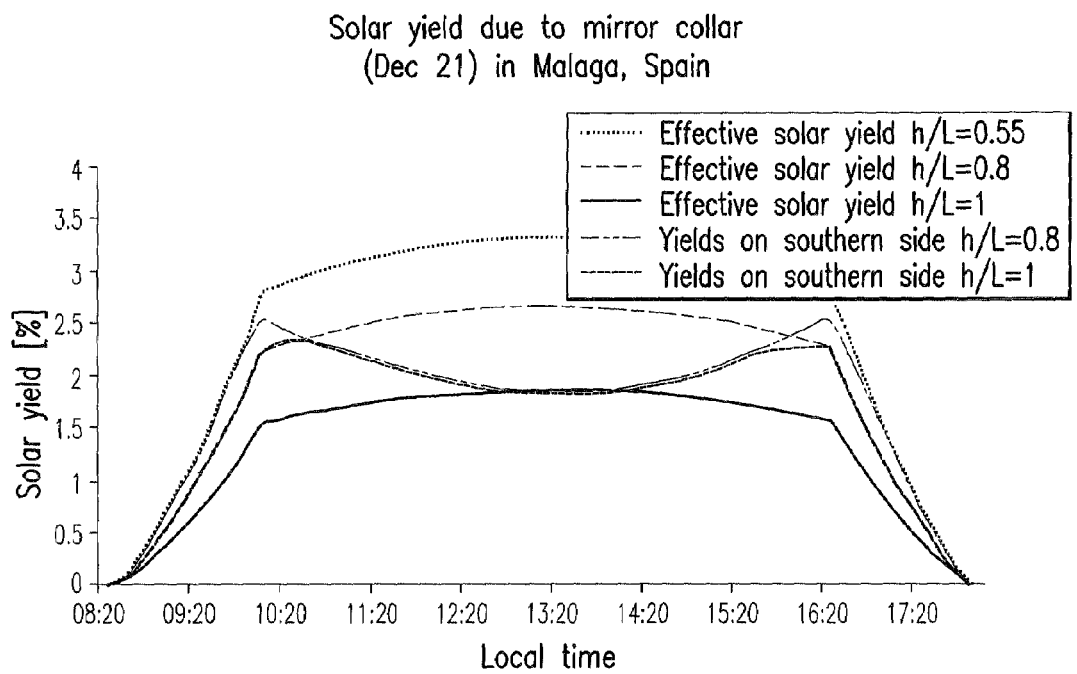

The effective solar yields for various h/L ratios are shown in FIGS. 20 through 22 for three values, i.e., h/L=0.55, h/L=0.8 and h/L=1. The yields on the southern side for 0.8 and for h/L=1 are also shown in FIG. 22.

LIST OF REFERENCE NUMERALS

10 Parabolic trough collector
11 Parabolic reflector
11a-d Parabolic segments
12 Support structure
13 Absorber tube
14 Support
15 Cladding tube
17 Compensation pieces
20 Mirror collar
20a Wide end of the cone
20b Narrow end of the cone
21, 24 Conic surfaces
22 Flat region
23 Reflective surface
30 Surface
31 Annular surface
50 Connection area
S Sun
SR Solar radiation

What is claimed is:

1. A parabolic trough collector comprising:
    an absorber tube (13) through which a heat transfer fluid is able to flow;
    a parabolic reflector (11) that focuses solar radiation onto the absorber tube;
    cladding tubes (15) enclosing the absorber tube (13) so that the absorber tube (13) extends through the cladding tubes (15);
    compensation pieces (17) for compensating differing length changes of the absorber tube and the cladding tubes due to thermal expansion, said compensation pieces (17) connecting the cladding tubes (15) to the absorber tube (13) so that connection areas (50) are formed between the cladding tubes; and
    mirror collars (20) arranged around the cladding tubes in the connection areas to partially or fully cover said compensation pieces (17) to provide at least partial protection of the compensation pieces (17) from the solar radiation;
    wherein the mirror collars (20) each have at least one reflective metal surface facing away from the cladding tubes (15) and said at least one reflective metal surface reflects a part of the solar radiation directed toward the cladding tubes (15) so that said part of the solar radiation passes through the cladding tubes (15) to the absorber tube (13); and
    wherein said at least one reflective metal surface consists of at least one planar surface (30).

2. The parabolic trough solar collector as defined in claim 1, wherein said at least one planar surface (30) consists of a single annular surface (31) that is oriented perpendicularly to the axis of the cladding tube (15) and is planar.

3. The parabolic trough collector as defined in claim 1, wherein said at least one reflective metal surface consists of a plurality of planar surfaces (30) circumferentially disposed around the cladding tube (15).

4. The parabolic trough collector as defined in claim 3, wherein each of said mirror collars (20) has from two to eight of said planar surfaces (30).

5. The parabolic trough collector as defined in claim 1, wherein each of said mirror collars (20) has a height (h) perpendicular to the axis of the cladding tubes (15), each of the connection areas have a length (L), and a ratio (h/L) of said height to said length is between 0.3 and 1.

6. The parabolic trough collector as defined in claim 1, wherein the parabolic reflector (11) tracks the sun via a single axis.

7. The parabolic trough collector as defined in claim 1, wherein each of said mirror collars (20) is composed of aluminum.

8. A solar collector comprising:
    an absorber tube (13) through which a heat-transfer medium is able to flow;
    a concentrator that focuses solar radiation onto the absorber tube;
    at least one radiation-permeable cladding tube (15) enclosing the absorber tube (13);
    compensation pieces (17) for length compensation provided at respective ends of the at least one cladding tube (15) in connection areas (50); and
    at least one mirror collar (20) arranged around the cladding tubes in the connection areas to partially or fully cover said compensation pieces (17) to provide at least partial protection of the compensation pieces (17) from the solar radiation;
    wherein each of said at least one mirror collar (20) have at least one reflective metal surface facing away from the cladding tubes (15) and said at least one reflective metal surface reflects a part of the solar radiation directed toward the cladding tubes (15) so that said part of the solar radiation passes through the cladding tubes (15) to the absorber tube (13); and wherein said at least one reflective metal surface consists of at least one planar surface (30).

9. The solar collector as defined in claim 8, wherein said at least one planar surface (30) consists of a single annular surface (31) that is oriented perpendicularly to the axis of the cladding tube (15) and is planar.

10. The solar collector as defined in claim 8, wherein said at least one reflective metal surface consists of a plurality of planar surfaces (30) circumferentially disposed around the cladding tube (15).

11. The solar collector as defined in claim 10, wherein each of said at least one mirror collar (20) has from two to eight of said planar surfaces (30).

12. The solar collector as defined in claim 8, wherein each of said at least one mirror collar (20) has a height (h) perpendicular to the axis of the cladding tube (15), each of the connection areas have a length (L), and a ratio (h/L) of said height to said length is between 0.3 and 1.

13. The solar collector as defined in claim 8, wherein each of said at least one mirror collar (20) is composed of aluminum.

* * * * *